Nov. 14, 1939.   H. HEINZELMANN   2,179,628
INTERNAL COMBUSTION ENGINE PLANT
Filed Oct. 12, 1937
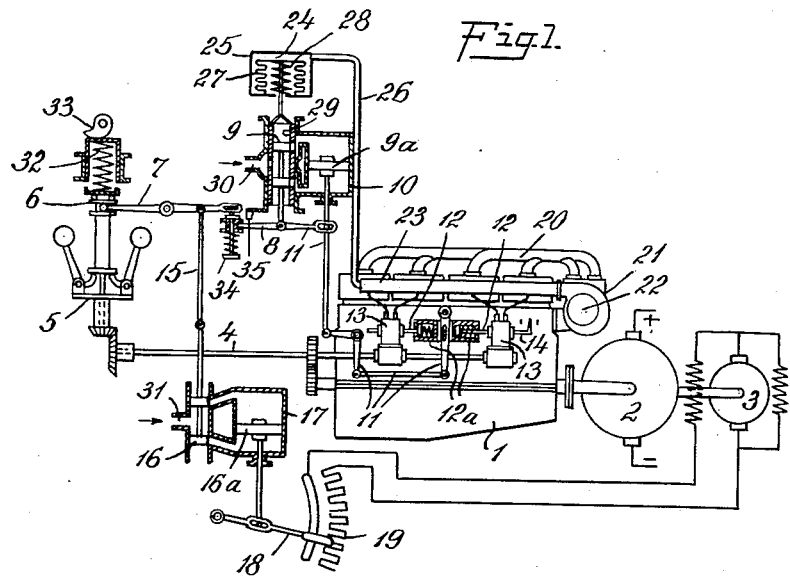
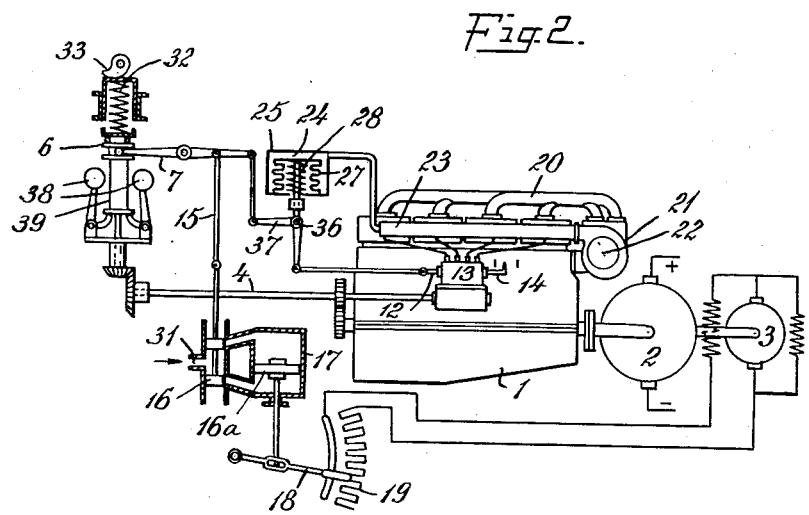
INVENTOR
HANS HEINZELMANN
BY
Pennie, Davis, Marvin † Edmonds
ATTORNEYS Patented Nov. 14, 1939

2,179,628

UNITED STATES PATENT OFFICE 2,179,628

INTERNAL COMBUSTION ENGINE PLANT

Hans Heinzelmann, Effretikon, Switzerland, assignor to Sulzer Freres, Societe Anonyme, Winterthur, Switzerland Application October 12, 1937, Serial No. 168,597
In Switzerland October 23, 1936

12 Claims. (Cl. 290—40)

This invention relates to an internal combustion engine plant and has for its object the provision of an improved combination of control apparatus for such plants. The plant of the invention comprises an indirect power transmission mechanism driven by the engine, and a fuel supply for the engine regulated in accordance with the engine speed and also by the pressure of charging air. The invention includes, in connection with the fuel regulation which is dependent upon the pressure of the charging air, means for controlling the power transmission apparatus.

In the accompanying drawing,

Fig. 1 shows an arrangement of apparatus in accordance with the invention, and

Fig. 2 shows a modified form of apparatus in accordance with the invention.

In Fig. 1 the combustion engine 1 drives the main generator 2 and the auxiliary generator 3. The amount of fuel injected into the engine is regulated by the speed governor 5 driven by the combustion engine 1 through the shaft 4, which governor displaces by its sleeve 6 through the levers 7 and 8, the valve 9 and the piston 9a of the servomotor 10 and also displaces through the rods 11 the regulating rods 12 of the fuel pumps 13 which are connected to the rods 11 by separate elastic members 12a. By the elastic members 12a the regulating rods 12 are yieldingly connected to the rods 11 on displacement toward the right, that is, in the direction of an increase of the fuel supply, while on displacement toward the left, that is, in the direction of the no load position, they are positively connected to the rods 11. The amount of the fuel supply is indicated by means of the pointer 14. The governor 5, by means of the rod 15 and the valve 16 and the piston 16a of the servomotor 17 adjusts the contact 18 of the regulating resistance 19 inserted in the field of the main generator 2.

The exhaust gases of the internal combustion engine are conveyed through the pipes 20 to the exhaust gas turbine 21 which drives the charging compressor 22, which conveys the charging air into the collector pipe 23 and from there into the individual cylinders. The space 24 of the regulating device 25 is connected to the collecting pipe 23 by means of the pipe 26. The diaphragm 27 is opposed on one side by the spring 28, and on the other side by the charging pressure. The diaphragm is connected to the intermediate valve 29 which has control members for the valve 9 of the servomotor 10. The pressure medium is fed to the servomotor 10 from the pipe 30 and to the servomotor 17 from the pipe 31. The speed of the internal combustion engine can be changed by change of the tension of the spring 32 of the speed governor 5 by twisting of the cam 33.

The operation of the apparatus of Fig. 1 is as follows:

Let it be assumed that all the regulating devices are in a state of equilibrium, so that the valves 9 and 16 are in the shut-off position shown in the drawing. From this state the following operations are carried out:

*Overload occurs.*—The centrifugally actuated weights of the speed governor 5 move inwardly, the sleeve 6 downwardly, the valve 9 upwardly so that pressure medium enters on the upper side of the piston 9a and presses it down. The regulating rods 12 move toward the right, and the quantity of fuel injected is increased. With the piston 9a, the lever 8 which is hinged to the piston rod of the piston 9a, moves the valve 9 downward and comes into the shut-off position shown in the drawing, whereby a new position of equilibrium is reached. The movement of the governor 5 has also caused valve 16 to move upward. As a result, pressure medium enters from the pipe 31 into the space above the piston 16a causing it to descend and switch in steps of the resistance 19. The excitation current is thereby reduced and also the load of the generator 2 and the load of the internal combustion engine 1, so that its speed again increases until the governor 5 has again occupied its initial position shown in the drawing and the valve 16 has come into its shut-off position. Simultaneously the piston 9a and the valve 9 have returned to the initial positions shown in the drawing. The charging pressure follows the changes of load very slowly. Since the servomotors 10 and 17 act very rapidly, it can practically be assumed that the intermediate valve 29 has not moved during the whole time. Accordingly, at the end of the regulating operation, all parts with the exception of the piston 16a, are again in the same position as shown in the drawing at the start. In case of a temporary reduction of the load, the operation takes place in the opposite sense.

*The charging pressure falls as a result of a disturbance in the charging group.*—The pressure in the space 24 is reduced so that the intermediate valve 29 is raised. Pressure medium now flows into the space below the piston 9a. This piston is raised and lessens the amount of fuel and brings the valve 9 again into the shut-off position. Now the speed of the internal combustion engine 1 decreases and the further operation or procedure is the same as described under "Overload". At the end of the whole regulating operation, when equilibrium again is established, the centrifugal weights of the governor 5, and also the sleeve 6 and the valve 16 have once more the same position; but all other parts have been displaced.

*Increase of speed by turning the cam 33 counterclockwise.*—It is assumed that the turning of the cam 33 takes place very rapidly so that the internal combustion engine 1 is not so rapidly accelerated that its speed always corresponds to the tension of the spring 32. The weights of the speed governor 5 then move inwardly as far as the construction allows, and the sleeve 6 makes its maximum throw downwardly. The spring member 34 is compressed and the lever 8 is pressed against the stop 35. The piston 9a is therefore limited in its downward movement. However, this limiting is not the same at all charging pressures, but the higher the intermediate valve 29 is, that is to say, the lower the charging pressure is, the smaller is the maximum amount of fuel injected. When the stop 35 is between the spring member 34 and the valve 9, in the shut-off position of the valve 9 the distance between the lever 8 and the stop 35 is not the same in all positions of the intermediate valve 29. The higher the intermediate valve 29 is, that is, the lower the charging pressure is, the smaller is the distance and accordingly the smaller is the possible overoad, which also is quite correct if one considers that the amount of fuel injected is smaller also. By arrangement of the stop 35 at a definite point between the spring member 34 and the valve 9 and possibly by construction of the stop 35 as a cam curve from which the lever 8 rolls off on overload and change of the position of the valve 29 with change of the point of contact in each case, the result can be accomplished that a definite overload is co-ordinated to every charging pressure.

During the whole accelerating operation the valve 16 was raised up so that the piston 16a during this time moved with respect to its lower end position. As soon as the speed corresponding to the spring tension set is reached, the load will be lower than the internal combustion engine can deliver. The further course of the regulating operation corresponds from then on to the regulating of an underload, as already described above. Since, however, the charging group 21, 22 is still in the acceleration period, the intermediate valve 29 will move slowly downward during the whole procedure or operation, whereby the amount of fuel injected is slowly increased. The thereby continuously resulting underload will be compensated for by the servomotor 10 by a lessening of the resistance 19.

As a result of the smaller amount of exhaust gas at low speed, the charging group 21, 22 then runs correspondingly slower so that the charging pressure is lower at low speed. The amount of fuel injected must then be reduced correspondingly. By suitable dimensioning or adjustment of the regulating device 25, one can arrange so that, at low speed, the amount of fuel will have exactly the maximum permissible value for the charging pressure present, or the quantity of fuel injected can be set at any desired lower value than corresponding to the charging pressure. This renders unnecessary a special device for adjusting reduced torques at low speeds. If, however, several torques are to be set for each speed, or if the charging protection is to be designed only for the case of disturbance, the regulating device 25 is so dimensioned that it releases the maximum amount of fuel corresponding to each charging pressure, and the normal-torque is set arbitrarily.

Fig. 2 shows a similar but somewhat modified apparatus for a direct acting speed governor 5. The speed adjustment and the operations in the servomotor 17 for the field regulation are the same as in Fig. 1. The device 25 dependent on the charging pressure acts on the center of rotation 36 of the angle lever 37 on the rod between the sleeve 6 of the speed governor 5 and the regulator 12 of the fuel pump 13. The position of equilibrium of the speed governor 5 always remains the same, since the servomotor 17 always adapts the load to the amount of fuel injected. In this case, it is assumed that the throw of the regulating weights of the speed governor 5 limits the overload-fuel quantity, as the overload position of the regulating rod 12 is reached when the regulating weights 38 strike on the sleeve 39 of the governor 5. In this arrangement, also, the limiting could be effected, as in Fig. 1, by a spring member and a stop on the rod of the governor. The mode of operation is in other respects the same as in Fig. 1 and could be used for adjustment of the rod 12. What has been stated in connection with the description of Fig. 1 with respect to the dimensioning of the charging means and the means for effecting reduced torques applies, with the necessary modifications, to the apparatus of Fig. 2.

I claim:

1. The combination with an internal combustion engine power plant which comprises, fuel means for admitting fuel to the engine, means responsive to engine speed operatively connected to the fuel means, means for charging air under pressure into the engine, means actuated by the charging air in engagement with the fuel means for influencing the fuel admission in accordance with the charging air pressure, a generator driven by the engine, a field excitation means for the generator, a voltage control means for varying the field excitation of the generator, and coupling members connecting the means responsive to engine speed and the voltage control means whereby the fuel admission and field excitation may be varied in accordance with engine speed.

2. In the combination of claim 1, a servomotor connected in the coupling means for actuating the voltage control.

3. In the combination of claim 1, a linkage connecting the means responsive to engine speed and the fuel means, said linkage having a displaceable center of motion.

4. In the combination of claim 1, a servomotor connected through linkage between the means responsive to engine speed and the fuel means.

5. In the combination of claim 1, a cam means for varying the effect of the speed responsive means.

6. In the combination of claim 1, a servomotor connected between the means responsive to engine speed and the fuel means, a regulating device responsive to the pressure of air charged into the engine, and means connecting the regulating device to the servomotor, whereby the action of the servomotor in varying the fuel means is influenced by the pressure of the charging air.

7. The combination with an internal combustion engine power plant which comprises, fuel means for regulating the admission of fuel to the engine, a speed governor driven by the engine, a linkage system connecting the governor with the fuel means, a generator driven by the engine, field excitation means for the generator, means operatively connecting the governor with the field excitation means, means for charging air under pressure into the engine, and a regulating device actuated by the charging air connected to the linkage, whereby the speed of the governor and the pressure of the charging air coact in varying the admission of fuel to the engine.

8. The combination with an internal combustion engine power plant which comprises an indirect power transmission coupled to the engine, a supercharger for charging air to the engine, fuel supply means for regulating the admission of fuel to the engine, means responsive to engine speed, means actuated by the charging air operatively connecting the fuel supply means, means for controlling the indirect power transmission to vary the load on the engine, coupling members connecting the speed responsive means, the means for controlling the indirect power transmission and the fuel supply means, and intermediate means connected to at least one of the coupling members and the means responsive to charging air for influencing the action of the speed responsive means on the fuel supply means.

9. In the combination of claim 8 a displaceable pivotal center of motion included in said coupling members.

10. In the combination of claim 8 a displaceable pivotal center of motion included in said coupling members, said intermediate means comprising a member connected to the coupling members and to the fuel supply means which is adapted to displace the pivotal center of the coupling member.

11. In the combination of claim 8 a servomotor operatively connected to the coupling members between the means responsive to engine speed and the fuel means.

12. In the combination of claim 8 a servomotor in the coupling members arranged to operate the means for controlling the indirect fuel transmission.

HANS HEINZELMANN.